United States Patent [19]

Dunn et al.

[11] Patent Number: 4,749,542

[45] Date of Patent: Jun. 7, 1988

[54] REMOVABLE CHECK VALVE FOR USE IN A NUCLEAR REACTOR

[75] Inventors: Charlton Dunn, Calabasas; Edward A. Gutzmann, Simi Valley, both of Calif.

[73] Assignee: The United States of America as represented by the United States Department of Energy, Washington, D.C.

[21] Appl. No.: 916,137

[22] Filed: Oct. 7, 1986

[51] Int. Cl.$^4$ .............................................. G21C 19/28
[52] U.S. Cl. .................................... 376/404; 376/203; 376/281
[58] Field of Search ............................ 137/512.1, 599; 376/203, 204, 281, 403, 404

[56] References Cited

U.S. PATENT DOCUMENTS

| | | | |
|---|---|---|---|
| 3,023,771 | 3/1962 | Hinds | 137/512.1 |
| 3,072,141 | 1/1963 | Wheeler | 137/512.1 |
| 3,074,427 | 1/1963 | Wheeler | 137/512.1 |
| 3,182,002 | 5/1965 | Laithwaite et al. | 376/403 |
| 3,726,296 | 4/1973 | Friedkend et al. | 137/599 |

FOREIGN PATENT DOCUMENTS 1075117  7/1967  United Kingdom ................ 376/281

Primary Examiner—Deborah L. Kyle
Assistant Examiner—Richard L. Klein
Attorney, Agent, or Firm—L. E. Carnahan; Roger S. Gaither; Judson R. Hightower

[57] ABSTRACT

A removable check valve for interconnecting the discharge duct of a pump and an inlet coolant duct of a reactor core in a pool-type nuclear reactor. A manifold assembly is provided having an outer periphery affixed to and in fluid communication with the discharge duct of the pump and has an inner periphery having at least one opening therethrough. A housing containing a check valve is located within the inner periphery of the manifold. The upper end of the housing has an opening in alignment with the opening in the manifold assembly, and seals are provided above and below the openings. The lower end of the housing is adapted for fluid communication with the inlet duct of the reactor core.

9 Claims, 5 Drawing Sheets

REMOVABLE CHECK VALVE FOR USE IN A NUCLEAR REACTOR

STATEMENT OF GOVERNEMTN INTEREST

The Government has rights in this invention pursuant to Contract (or Grant) No. DE-AT03-83SF11901 awarded by the U.S. Department of Energy.

BACKGROUND OF THE INVENTION

The present invention broadly relates to a valve assembly for use immersed in a liquid metal. It is particularly directed to a check valve assembly for interconnecting a pump discharge duct and a reactor coolant inlet duct in a pool-type, liquid-metal cooled, nuclear reactor.

The design of check valves and conduit assemblies for use in pool-type reactors is very demanding since there is a need for minimizing any stress resulting from thermal expansion and relative movement of the two components being interconnected. In addition, they must be capable of withstanding the calculated stress which would result from a seismic event having a specified magnitude. The problem in the design of check valve assemblies is further complicated by the fact that the valve assembly is generally inaccessible for inservice inspection since it is submerged in a pool of liquid metal.

In the design of nuclear reactors it is customary to provide a certain amount of redundancy in the interest of safety. For example, a loss of coolant accident could be catastrophic since the core would continue to generate heat and could result in a melt-down of the individual fuel assemblies. Accordingly, designs for such reactors usually provide for two or more pumps for supplying coolant through the reactor core. The use of multiple pumps, however, does present an additional problem. Specifically, if one pump fails coolant will flow not only through the reactor core from the other pump, but also will flow in a direction back through the inoperative pump. Accordingly, to offset this effect, some additional provisions must be made. It has been proposed to design the pumps with sufficient excess capacity to provide the required coolant flow through the reactor core as well as that which would backflow through the inoperative pump. This procedure results in a requirement for larger pumps and an increase in operating costs.

Another proposed approach utilizes a check valve located between the outlet of the pump and the inlet to the reactor core. This effectively eliminates backflow through the pump and the necessity of having pumps sized to accommodate such backflow. In the case of a pool-type reactor, however, this necessarily requires that the check valve be located within the pool of coolant. Since the check valve involves moving parts it should be accessible for inspection, maintenance and repair if required. To provide such access it has been proposed to locate the check valve in a well or tank which extends from an upper portion of the reactor vessel down into the pool of liquid coolant. The tank and check valve are connected with nonremovable piping to the outlet of the pump and the inlet to the reactor core. A disadvantage of this approach was the necessity of an additional penetration through the reactor vessel, the space required for the tank and the increased cost. In addition, this approach could only be used with nonremovable piping.

Obviously it would be advantageous to have a check valve assembly which did not require a separate penetration through the reactor vessel since such penetration potentially jeopardizes the integrity of the vessel. In addition, it would be advantageous as such if a check valve assembly could be provided which could be utilized with removable piping.

OBJECTS OF THE INVENTION

In view of the foregoing, one object of the present invention is to provide a readily fabricatable, uncomplicated valve assembly for interconnecting a pump and a coolant inlet manifold of a nuclear reactor which valve assembly is immersed in a pool of a liquid metal coolant.

Another object of the invention is to provide a valve assembly which is readily removable from a pool of liquid metal for inspection and repair.

Still another object of the invention is to provide such a valve assembly in which the seals are readily replaceable when required.

It is also an object of the invention to provide such a valve assembly which does not require precision machining or the maintenance of close tolerances to prevent leakage.

Another object of the invention is to provide such a check valve assembly which contains multiple valves to provide redundancy in case of failure of one valve.

Another object of the invention is to provide such a check valve assembly which can be used with or be an integral part of a removable conduit assembly.

Yet another object of the invention is to provide a check valve assembly for use in a pool-type reactor which does not require an additional penetration through the vessel for its insertion or removal.

These and numerous other objects of the invention will be more apparent from the drawings and description thereof.

SUMMARY OF THE INVENTION

The present invention provides a removable check valve assembly for interconnecting the discharge duct of a pump and an inlet coolant duct of a reactor core in a pool-type, liquid metal-cooled nuclear reactor. In accordance with a particularly preferred embodiment of the invention, the check valve assembly comprises a portion of a removable conduit assembly for interconnecting a pump discharge duct and reactor inlet coolant duct.

Broadly, the invention includes a manifold assembly having an outer periphery affixed to and in fluid communication with the discharge duct of the pump and a inner periphery having at least one opening therethrough. It further includes a check valve assembly including a housing having upper and lower ends; the lower end being adapted for fluid communication with the inlet duct of a reactor core. The upper end of the housing has an outer periphery slightly less than and conforming to that of the inner periphery of the manifold. The outer periphery of the housing is provided with an opening in alignment with the opening in a manifold assembly. A valve means is located adjacent the opening in the housing and comprises a gate member pivotally mounted at its upper end to the housing and provided with a sealing surface for engaging and closing off the opening in the housing. During normal operation of the pump the flow of coolant through the opening will maintain the check valve means in an open position. In the event of a pump failure, pressure from other operating pumps and gravity will cause the check valve gate meaber to drop to a closed position such that coolant flow in a reverse direction is substantially prohibited. Extending radially about the outer periphery of the upper end of the housing are two spaced apart seal means. One seal means is located above the opening in the housing and the other below the opening. The function of the two seal means is, of course, to insure that substantially all of the coolant from the manifold assembly flows through the openings and through the check valve assembly.

In accordance with a particularly preferred embodiment, the valve assembly is an integral part of a removable conduit assembly. Specifically, the valve assembly comprises the upper section of a multisection tubular conduit assembly. Typically, the conduit assembly will include an upper first section containing a check valve and adapted for connection to the discharge of a reactor pump in accordance with the present invention. The conduit assembly also includes a lower second section adapted for connection with a coolant inlet duct of the reactor core, and a third intermediate tubular section for interconnecting to the other two sections.

The conduit assembly also includes first and second joint means for respectively connecting one end of the intermediate section with an adjoining end of the upper section and an opposite end of the intermediate section with an adjoining end of the lower section. Each of the first and second joint means includes a male portion having a ridge adjacent an end thereof, a circumferential groove is provided in the ridge for receiving a seal means. An associated female portion has an inside diameter greater than that of said ridge for receiving said male portion and said seal means.

The seal means is radially compressible and has an unrestrained outside diameter greater than that of the inside diameter of the female portion such that it is maintained in contact therewith. The outer periphery of the seal means also is radiused to permit pivotal motion of the tubular sections while maintaining sealing contacts. The joint means further includes means for interlocking the male and female portions together while providing a predetermined amount of axial or pivotal movement. A preferred sealing means comprises a split cylindrical piston ring having a spherical outer surface and which has overlapping ends. Advantageously, the ends are provided with opposed, axially projecting tab means for permitting radially inward compression of the ring while limiting radially outward expansion to assist in the assembly of the joint means.

A third joint means is provided adjacent a lower end of the lower tubular section. The third joint means also comprises a male portion provided with a compressible metallic seal means and a female portion for receiving said male portion and compressible seal means. A preferred sealing means is a split cylindrical piston ring having overlapping ends. Advantageously, the female portion is provided with a radially outwardly flared opening for guiding said male portion into position and compressing said seal means.

DETAILED DESCRIPTION OF THE DRAWINGS

Figure 1:
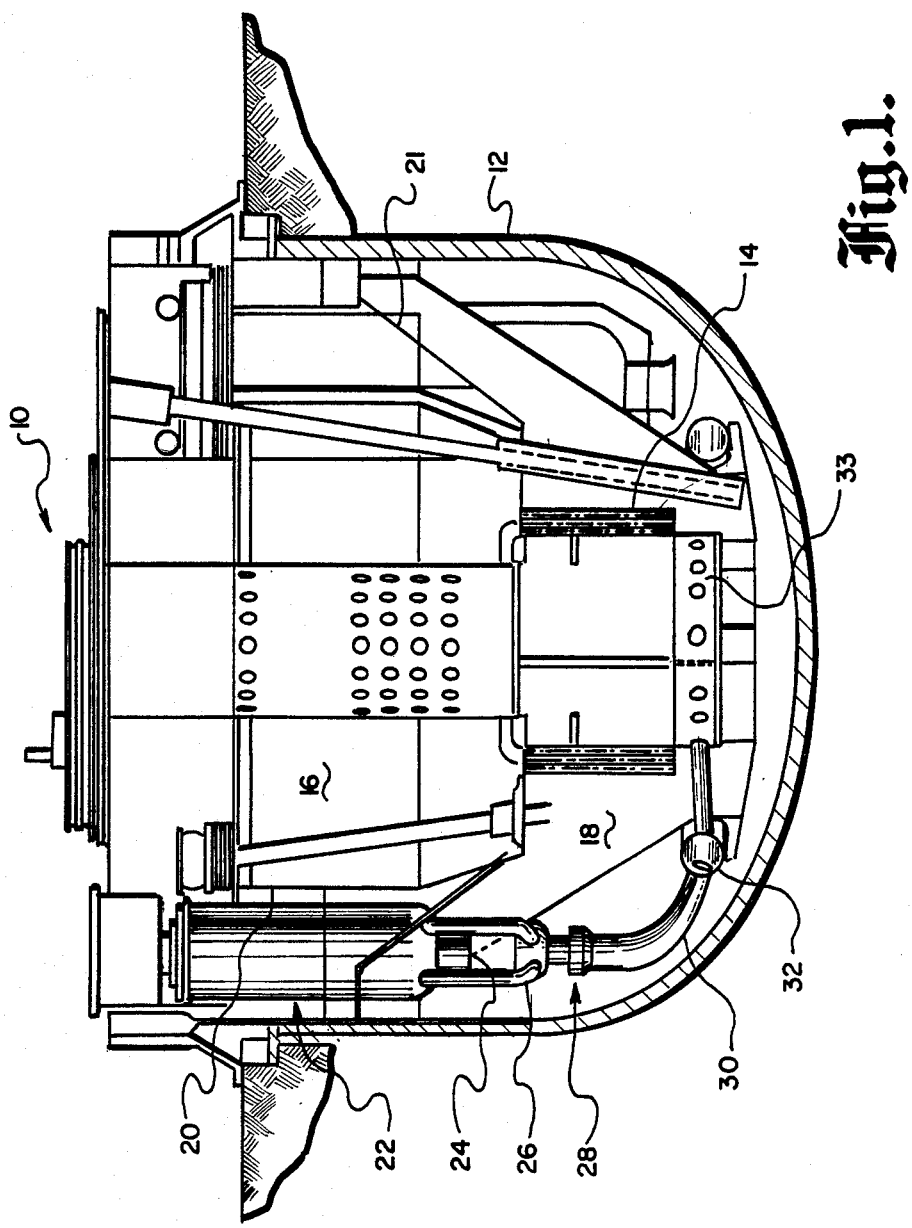
FIG. 1 is an elevation view diagrammatically illustrating pertinent parts of a pool-type, liquid-metal cooled, nuclear reactor including a check valve assembly of the present invention.

Turning now to the drawings wherein like components and features are designated by like reference numerals throughout the various figures, attention is specifically directed to FIG. 1 which illustrates a pool-type, liquid-metal cooled nuclear reactor generally designated by the reference numeral 10. As shown, the reactor includes a containment vessel 12 containing a core barrel 14. Containment vessel 12 is divided into two compartments, 16 and 18 by a barrier generally referred to as a redan 20. Each of compartments 16 and 18 contain a body of liquid metal coolant which typically will be sodium, potassium or a mixture thereof. As shown, reactor 10 also includes a pump assembly 22 which is partially immersed in the liquid metal in compartment 18. Pump assembly 22 has an inlet duct 24 at its lower end and a discharge manifold 26 which terminates in a combined removable check valve and conduit assembly 28 of the present invention. Conduit assembly 28 is in turn connected to a coolant inlet duct 30 which is permanently installed and in fluid communication with a manifold 32 which distributes coolant to a reactor plenum 33. The liquid metal coolant flows from plenum 33 through reactor core within core barrel 14 where the coolant absorbs heat before entering compartment 16. From compartment 16 the coolant flows through a heat exchanger 21 and then back to compartment 18.

It will be appreciated that the reactor also includes numerous other components and assemblies some of which also will be located within the sodium pool. For purposes of understanding the present invention, however, it is only necessary to understand how the coolant pump is interconnected to the reactor core barrel.

Typically, the distance from the centerline of the core to the pump may be as much as 30 feet and the height of the reactor vessel in excess of 60 feet. Thus, a substantial length of ducting is required to interconnect the pump discharge and the core barrel plenum. The duct must be capable of accommodating mechanical vibration resulting from pump operation as well as a seismic disturbance. Further, it must be able to accommodate any stress and distortion induced by the changes of pressure within the duct as well as changes in operating temperature; the latter of which may vary from as low as ambient at start up to about 1000° C. during normal operation. The manner in which assembly 28 accommodates these variations will be more apparent with reference to FIGS. 2 through 6.

Figure 2:
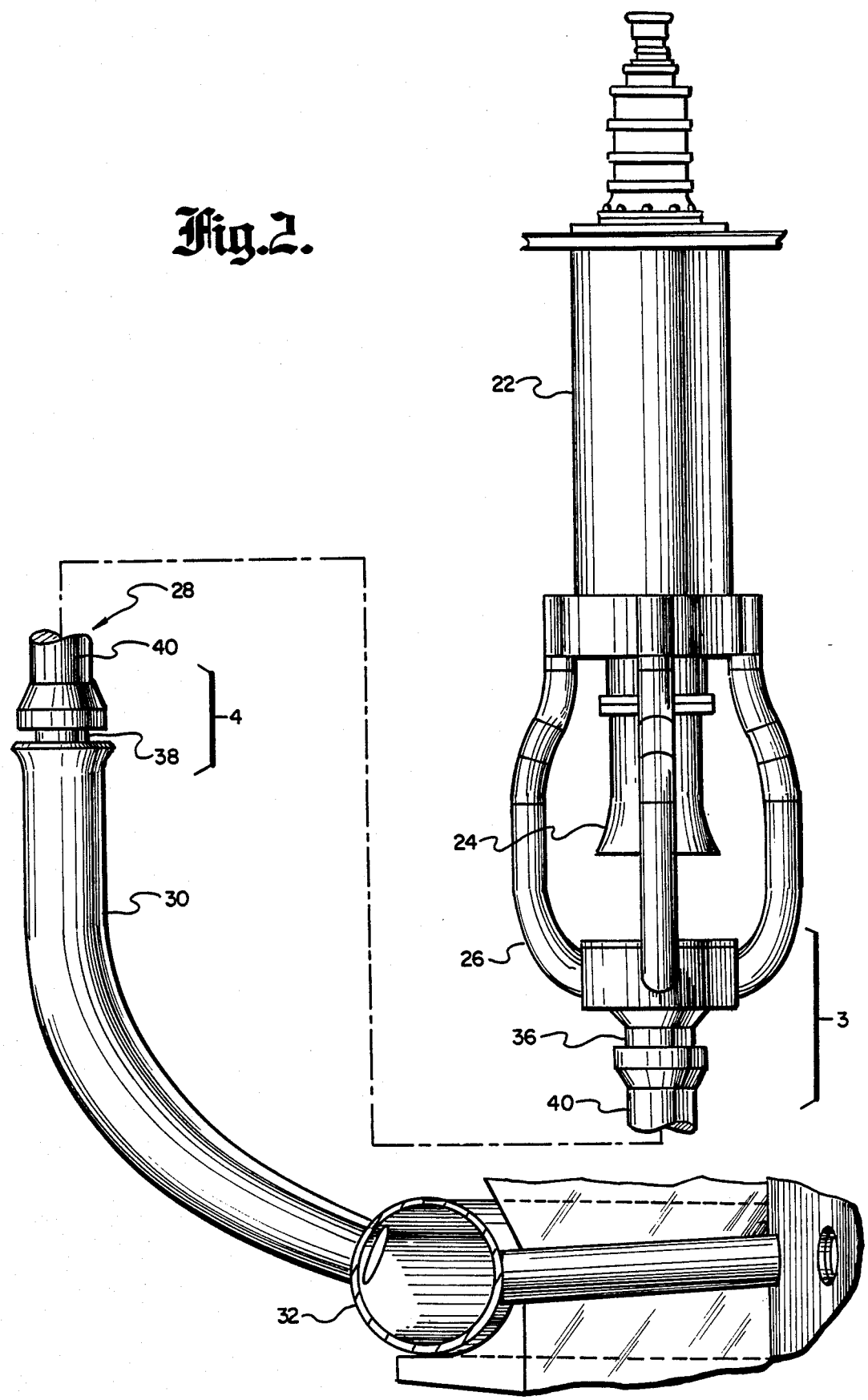
FIG. 2 is an enlarged elevation view showing a check valve as a part of a conduit assembly in a preferred embodiment of the present invention.

Referring to FIG. 2 in particular, it will be seen that conduit assembly 28 comprises three cylindrical sections. A first upper section 36 connected to the discharge duct 26 of pump assembly 22, a lower second section 38 having a lower end connected to coolant inlet duct 30 and a third intermediate section 40 having an upper end connected to first section 36 and a lower end connected to second section 38.

Figure 3:
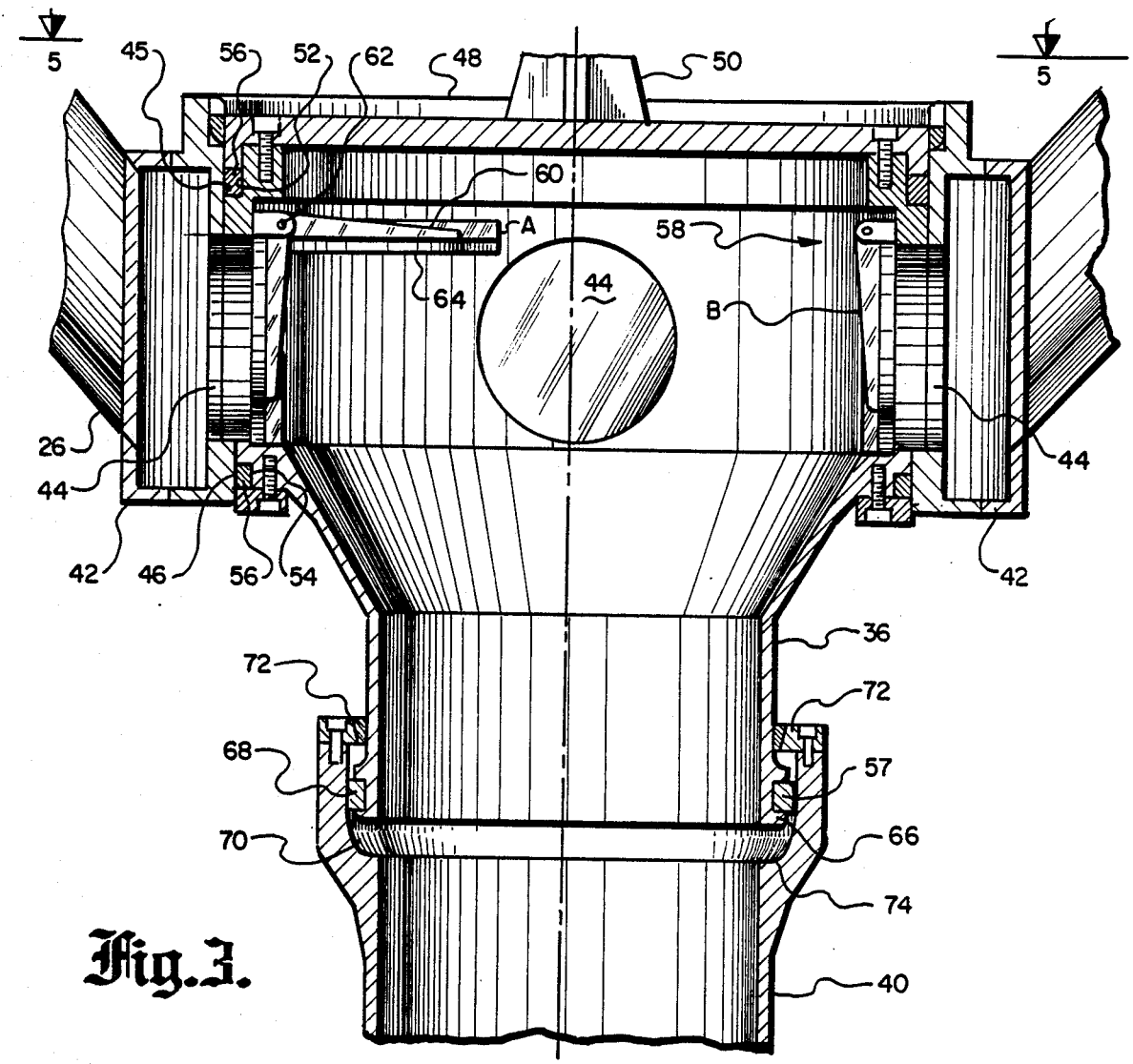
FIG. 3 is an enlarged elevation view in section of the upper half of the check valve assembly and conduit assembly.
Figure 5:
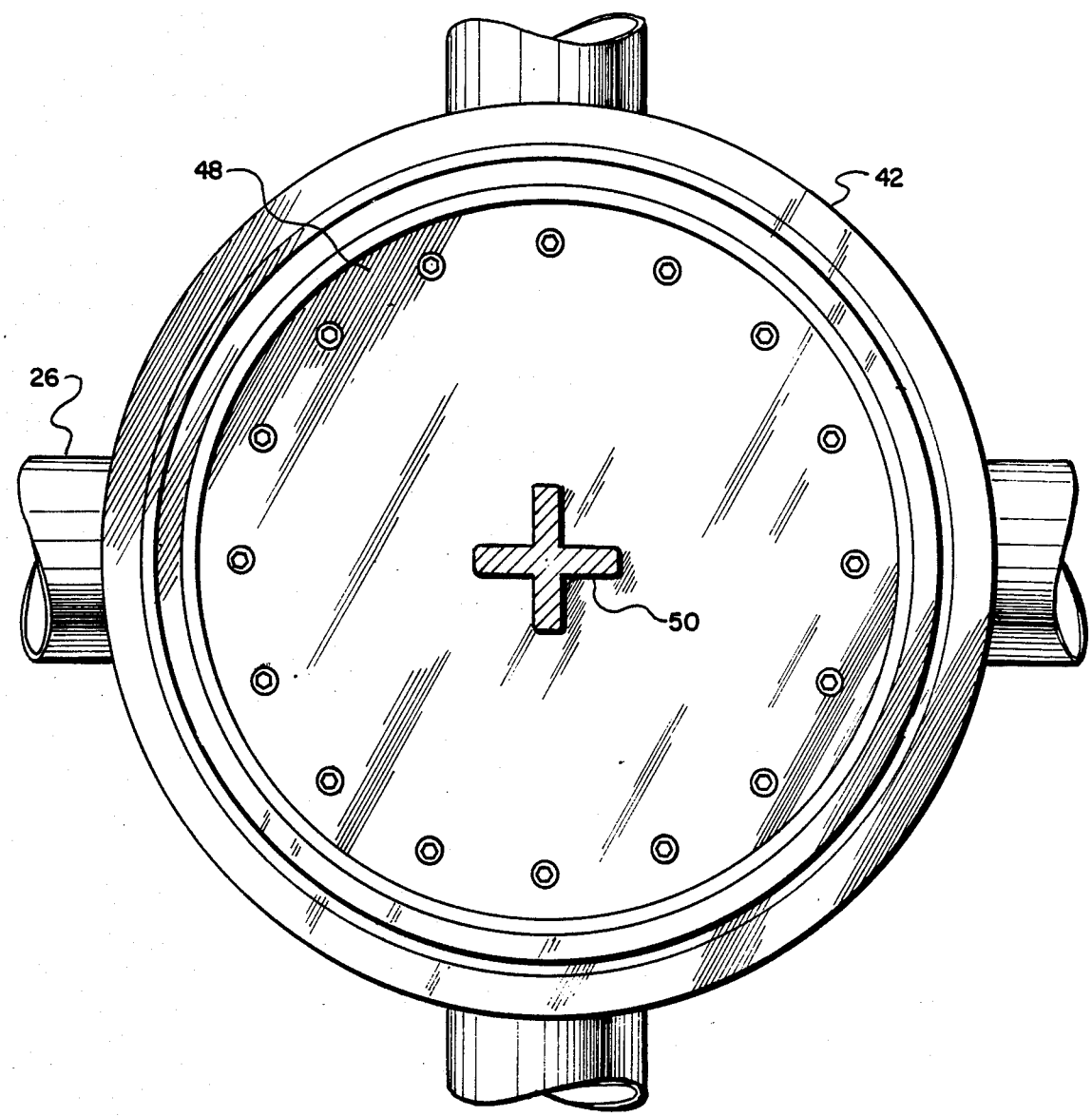
FIG. 5 is top view of FIG. 3 taken along line 5—5.

Referring now to FIGS. 3 and 5 in particular it will be seen that discharge duct 26 of pump assembly 22 is provided at its terminal end with a substantially cylindrical manifold 42 having a plurality of openings 44. Manifold 42 is located directly below pump inlet duct 24. In accordance with the present invention, manifold 42 has an inside diameter greater than that of check valve and conduit assembly 28 such that conduit assembly 28 may be removed for service, inspection or the like in a manner which will be described later. Assembly 28 also has a smaller diameter than pump inlet duct 24. The inner circumference of manifold 42 includes upper and lower sealing surfaces 45 and 46 respectively. Surfaces 45 and 46 are located about the inside periphery of manifold 42 above and below openings 44. An upper portion of first section 36 of assembly 28 has an upper end which forms a housing for a plurality of check valves adapted for removable mounting within cylindrical manifold 42. First upper section 36 is closed at its top end by plate member 48 which extends beyond the inner periphery of manifold 42 and rests upon an upper portion of manifold 42 for supporting assembly 28. Centrally located on an upper surface of plate member 48 is a connecting member 50 which provides means for engagement by a grapple. First upper section 36 also is provided adjacent its upper end with two radially disposed grooves 52 and 54 located adjacent sealing surfaces 45 and 46 respectively. Located within each of grooves 52 and 54 is a seal means 56.

Upper section 36 also includes a plurality of check valve assemblies 58. In the embodiment depicted each check valve assembly 58 comprises an arm member 60 pivotally mounted at its upper end 62. Arm member 60 has affixed thereto a sealing surface 64. During normal operation, the flow of coolant through openings 44 will open check valve assembly 58 as shown in position A. In the event of a pump failure or shut-down, pressure from other operating pumps and/or gravity will cause check valve arm member 60 to drop to a closed position as shown at B such that coolant flow in a reverse direction is substantially prohibited.

Upper section 36 terminates at its lower end in a male portion having a raised ridge portion 66. Located within the outer periphery of ridge portion 66 is a circumferentially extending groove 68 in which is located another seal means 57.

Seal means 57 is in contact and sealing engagement with an interior female sealing surface 70 of intermediate section 40. Advantageously, surface 70 is provided with a spherical radius R to accommodate pivotal misalignment between sections 36 and 40. The upper end of intermediate section 40 also is provided with removable flange members 72 which typically will be in two or more removable sections for ease of installation. There also is provided a shoulder 74 which together with flange member 72 limit the amount of axial movement of ridge 66 and seal means 57 along surface 70. Intermediate section 40 is connected at its lower end to a lower section 38 in an identical manner. It will be appreciated of course that either of the male and female portions of each section could be reversed.

The lower end of section 38 terminates in a male portion having a circumferentially extending ridge portion 74 which has an annular recess 76. Located within annular recess 76 is a seal means 56' which is in sealing engagement with an inner surface 78 of an upwardly extending portion of coolant inlet duct 30. Advantageously, the upper end of coolant duct 30 terminates in a radially outwardly flared portion 80 which has an inside diameter at its uppermost terminal end which is greater than that of the unrestrained diameter of seal means 56' to act as a guide to facilitate insertion of the lower end of lower section 38 into duct 30.

Figure 4:
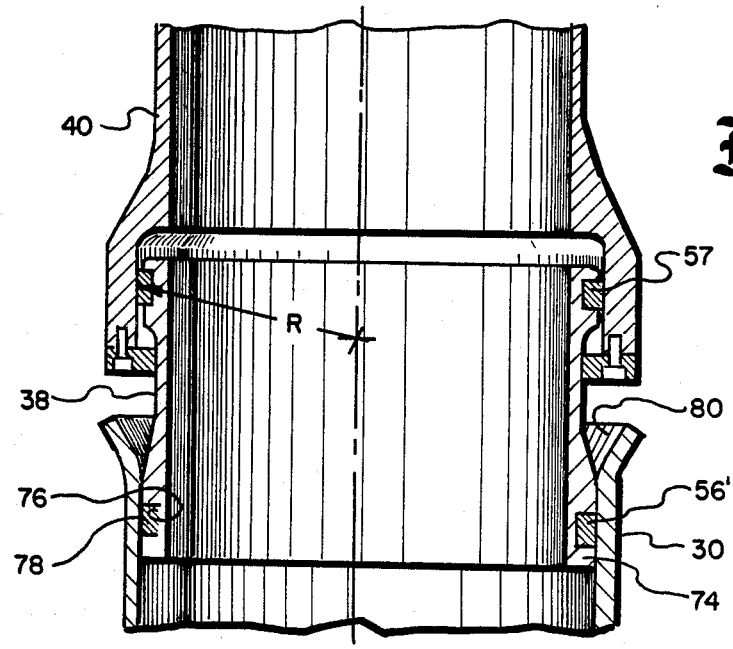
FIG. 4 is an enlarged elevation view in section of the lower half of the conduit assembly.
Figure 6:
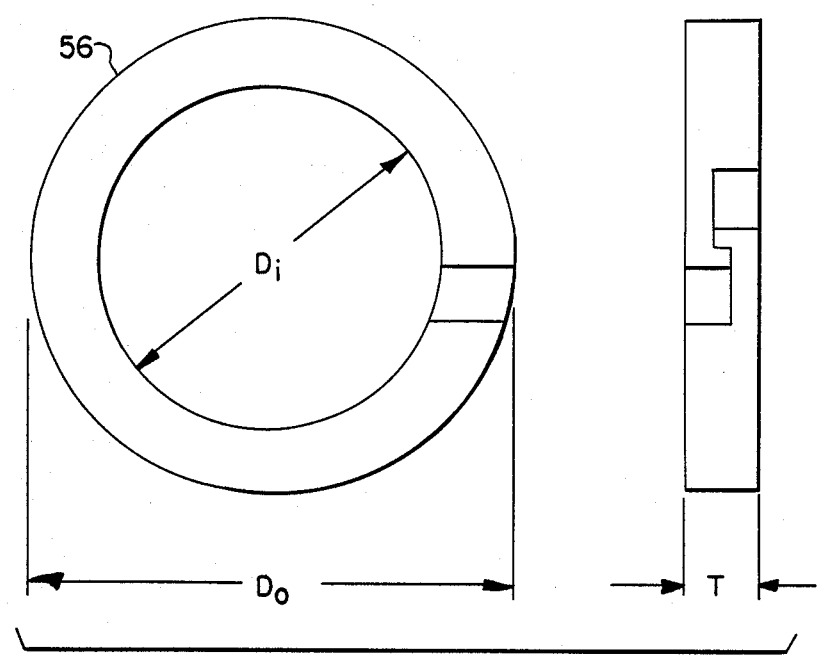
FIG. 6 is one seal means of the present invention.
Figure 7:
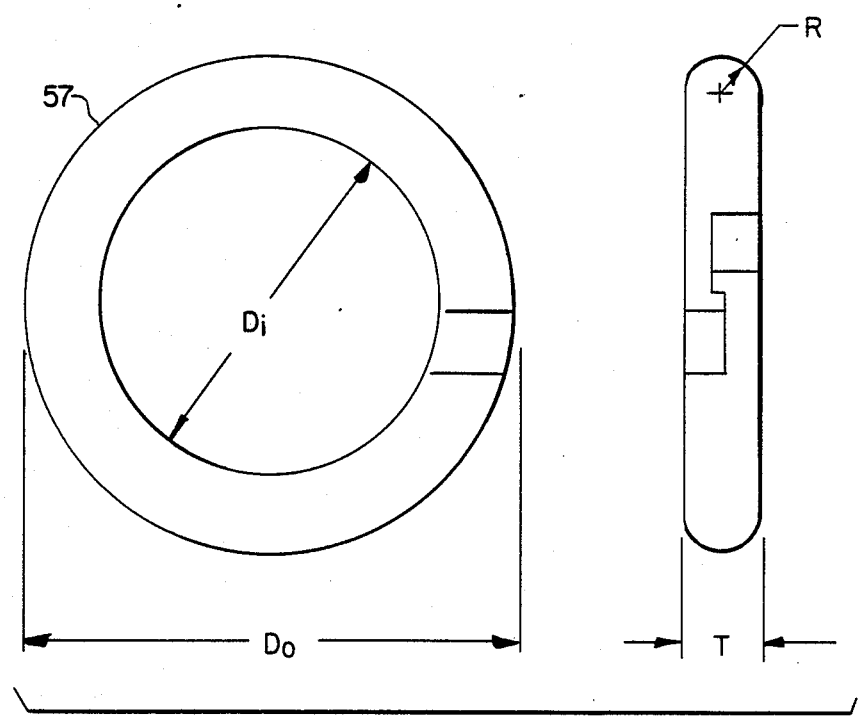
FIG. 7 is another seal means of the present invention.

The preferred seal means for use in the present invention are shown in FIGS. 6 and 7 and described in co-pending application Ser. No. 06/885,363 filed July 14, 1986 and assigned to the assignee of the present invention, the disclosure of said co-pending application being incorporated herein by reference. In accordance with the preferred embodiment each of the seal means comprises a split cylindrical piston ring which has overlapping ends. Each overlapping end is provided with an axially projecting, opposing tab means which overlap and will permit radial compression of the seal means but limit the radially outward expansion. The principal difference between seal means 56 and 57, as can be seen in FIGS. 6 and 7 respectively is that the outside periphery of seal means 57 has a spherical radius. The spherical radius is selected to coincide with the spherical radius of the female sealing surface with which it is to be in contact, for example, surfaces 70 as shown in FIGS. 3 and 4. As to seal means 56 and 56' they are substantially identical in appearance and configuration, though the overall dimensions may differ.

In the maximum radially expanded position, each seal means has an outside diameter $D_O$ which is slighly greater than the inside diameter of the female portion of the duct assembly into which it is to be inserted to insure maximum sealing effectiveness about the periphery of the seal means. The inside diameter, $D_I$, is not particularly critical provided, however, that when inserted in the female duct portion the seal means is not compressed to such an extent that $D_I$ the inside diameter of the seal is less than diameter of the bottom portion of the recess in which it is placed. The thickness of the seal will be selected to provide for some clearance in the recess to facilitate installation and minimize any binding within the recess in which it is to be installed. However, all of these dimensional factors are well within the skill of the artisan, the specific dimensions being a matter of design choice.

It is a particular advantage of the present invention that leakage of fluid flowing through the assembly is readily controllable to less than 0.5% of the total flow. It is another advantage of the preferred embodiment of the invention depicted that the check valve and conduit may be removed from the pool of liquid metal coolant for inspection, replacement of seals or the like. This is accomplished by first shutting down pump assembly 22 and removing the internal parts therefrom. After the internal parts have been removed from pump assembly 22, a grapple (not shown) may be inserted through the housing of pump assembly 22 through inlet duct 24 and connected to connecting member 50. Thereafter the entire check valve and duct assembly 28 may be pulled upwardly through the inlet duct 24 and out of pump assembly 22. Generally there would be provided some releasable latching means for maintaining duct assembly 28 in position during normal operation and releasing it for removal when desired.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a pool-type nuclear reactor, a removable check valve assembly for interconnecting a discharge duct of a pump and an inlet coolant duct of a reactor core in said pool-type nuclear reactor, said valve assembly comprising:

a manifold assembly having an outer periphery affixed to and in fluid communication with the discharge duct of said pump and an inner periphery having at least one opening therethrough;

a check valve assembly including a housing having upper and lower ends, said lower end being adapted for fluid communication with the inlet duct of said reactor core, the upper end of the housing having an outer periphery slightly less than and conforming to that of the inner periphery of said manifold assembly for insertion into and removal from said manifold assembly, the outer periphery of the housing having an opening in alignment with the opening in said manifold assembly, a valve means adjacent the opening in said housing comprising means pivotally mounting a gate member at an upper end thereof, said gate member being provided with a sealing surface for engaging and closing off the opening in the housing whereby during normal operation a flow of coolant through the opening will maintain the valve means in an open position and in the event of a pump failure pressure from other operating pumps and gravity will cause the valve means gate member to drop to a closed position such that coolant flow in a reverse direction is substantially prohibited; and at least two seal means, each extending about the outer periphery of the upper end of the housing, one being located above and the other below the opening in the housing.

2. The assembly of claim 1 further including means associated with said housing for supporting said housing on said manifold assembly.

3. The assembly of claim 1 wherein said manifold assembly has a plurality of openings on its inner periphery and the outer periphery of said housing is also provided with a plurality of openings in alignment with the openings in the manifold assembly.

4. The assembly of claim 1 wherein each of said seal means comprises a split ring having overlapping ends located in grooves in said housing.

5. The assembly of claim 1 wherein said housing and check valve assemblies are an integral part of a removable conduit assembly.

6. In a pool-type nuclear reactor, a removable check valve assembly for interconnecting a discharge duct of a pump and an inlet coolant duct of a reactor core in said pool-type nuclear reactors, said valve assembly comprising:

a manifold assembly having an outer periphery affixed to and in fluid communication with the discharge duct of said pump and an inner periphery having at least one opening therethrough;

a check valve assembly including a housing having upper and lower ends, said lower end being adapted for fluid communication with the inlet duct of said reactor core, the upper end of the housing having an outer periphery slightly less than and conforming to that of the inner periphery of said manifold assembly for insertion into and removal from said manifold assembly, the outer periphery of the housing having an opening in alignment with the opening in said manifold assembly, a valve means adjacent the opening in said housing comprising means pivotally mounting a gate member at an upper end therof, said gate member being provided with a sealing surface for engaging and closing off the opening in the housing whereby during normal operation a flow of coolant through the opening will maintain the valve means in an open position and in the event of a pump failure pressure from other operating pumps and gravity will cause the valve means gate member to drop to a closed position such that coolant flow in a reverse direction is substantially prohibited; and at least two seal means, each extending about the outer periphery of the upper end of the housing, one being located in a groove above the opening and the other in a groove below the opening, said seal means including a split cylindrical ring having overlapping ends and being located in said grooves.

7. The assembly of claim 6 further including means associated with said housing for supporting said housing on said manifold assembly.

8. The assembly of claim 7 wherein said manifold assembly has a plurality of openings on its inner periphery and the outer periphery of said housing is also provided with a plurality of openings in alignment with the openings and the manifold assembly.

9. The assembly of claim 8 wherein said housing and check valve assemblies are an integral part of a removable conduit assembly.

* * * * *